US009850838B1

(12) United States Patent
Chow

(10) Patent No.: US 9,850,838 B1
(45) Date of Patent: Dec. 26, 2017

(54) ENGINE SHOCK DAMPENING SYSTEM

(71) Applicant: Toyota Motor Engineering & Manufacturing North America, Inc., Erlanger, KY (US)

(72) Inventor: Justin J. Chow, Los Angeles, CA (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 0 days.

(21) Appl. No.: 15/284,322

(22) Filed: Oct. 3, 2016

(51) Int. Cl.
| | |
|---|---|
| *F02D 41/26* | (2006.01) |
| *F02D 41/06* | (2006.01) |
| *F02D 41/00* | (2006.01) |
| *B60W 20/40* | (2016.01) |

(52) U.S. Cl.
CPC ........... *F02D 41/062* (2013.01); *B60W 20/40* (2013.01); *F02D 41/0097* (2013.01); *F02D 41/26* (2013.01); *B60Y 2200/92* (2013.01); *B60Y 2300/58* (2013.01); *F02D 2200/501* (2013.01); *F02D 2200/602* (2013.01); *F02D 2250/28* (2013.01); *Y10S 903/905* (2013.01)

(58) Field of Classification Search
CPC ...... F02D 41/26; F02D 41/00; F02D 41/0097; F02D 41/062; F02D 2200/501; F02D 2200/602; F02D 2250/28; B60W 20/40; B60Y 2200/92; B60Y 2250/28
See application file for complete search history.

(56) References Cited

U.S. PATENT DOCUMENTS

| | | |
|---|---|---|
| 6,102,144 A | 8/2000 | Lutz |
| 6,621,244 B1 | 9/2003 | Kiyomiya et al. |
| 7,237,634 B2 | 7/2007 | Severinsky et al. |
| 7,344,129 B2 | 3/2008 | Nemoto |
| 7,357,204 B2 * | 4/2008 | Hisada .................. B60K 6/445 180/381 |
| 7,489,114 B2 | 2/2009 | Nomura et al. |
| 7,762,922 B2 | 7/2010 | Dreibholz et al. |
| 8,226,516 B2 | 7/2012 | Swales et al. |
| 8,676,414 B2 | 3/2014 | Luo et al. |
| 8,758,200 B2 | 6/2014 | Dai et al. |
| 8,979,694 B2 | 3/2015 | Holmes et al. |
| 9,254,836 B2 | 2/2016 | Tokai |
| 2009/0253550 A1 | 10/2009 | Reinhart et al. |

(Continued)

FOREIGN PATENT DOCUMENTS

JP          61065950 A  *  4/1986  ............... F16H 5/66

*Primary Examiner* — Hieu T Vo
(74) *Attorney, Agent, or Firm* — Snell & Wilmer L.L.P.

(57) ABSTRACT

A system for reducing vibration from an engine shock event caused by turning on an engine of a vehicle. The system includes an engine vibration sensor connected to the engine and configured to detect vibration data. The system includes an engine shock dampening unit configured to analyze the vibration data received from the engine vibration sensor to detect the engine shock event. The engine shock dampening unit is further configured to determine a vibration cancellation instruction for partially or completely cancelling the vibration from the engine shock event when the engine shock event is detected. The system includes a vibration unit configured to vibrate in an opposing direction of the vibration from the engine shock event based on the vibration cancellation instruction such that the vibration from the engine shock event is reduced.

20 Claims, 7 Drawing Sheets

(56) References Cited

U.S. PATENT DOCUMENTS

| | | |
|---|---|---|
| 2013/0009403 A1 | 1/2013 | Cornelius |
| 2013/0085634 A1 | 4/2013 | Jinbo |
| 2015/0369359 A1* | 12/2015 | Tsutsui .................. F16H 59/14 477/115 |
| 2016/0046283 A1 | 2/2016 | Tagami et al. |

* cited by examiner

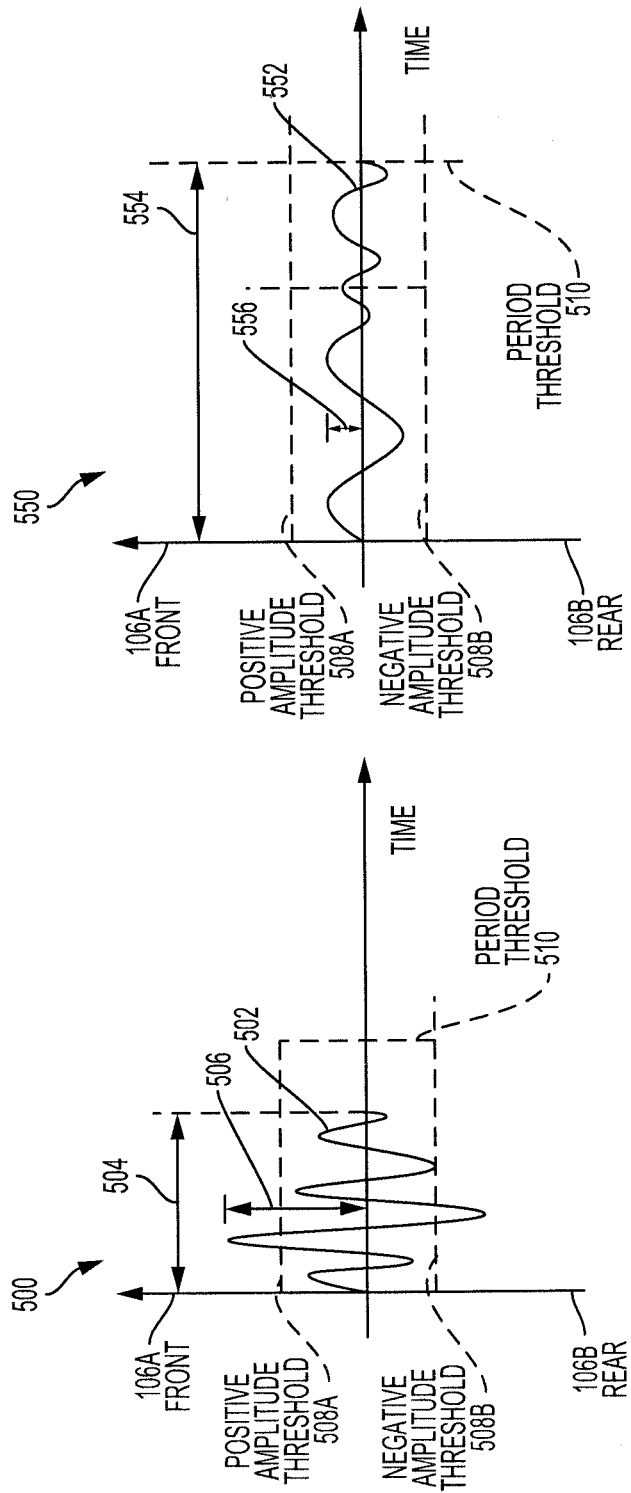

ENGINE SHOCK DAMPENING SYSTEM

BACKGROUND

1. Field

The present disclosure relates to a system and a method for providing a more comfortable experience for an occupant of a vehicle, and more particularly to a system and a method for dampening a force experienced by the occupant from an engine shock event.

2. Description of the Related Art

The engine of a vehicle, such as a car, may be turned off and on at different times. Hybrid vehicles may turn the engine off when using a motor to power the hybrid vehicle. Internal combustion engine vehicles and hybrid vehicles may turn the engine off when idling. When the engine is turned on, the engine crankshaft is turned. Depending on the position of the crankshaft, an engine shock event may occur when the crankshaft is turned to start the engine. An engine shock event may be a loud audible sound and cause undesirable movement or vibration of the vehicle such as a force may be felt by a driver or other occupant of the vehicle. The engine shock event may be uncomfortable and undesirable for an occupant of the vehicle.

SUMMARY

What is described is a system for reducing vibration from an engine shock event caused by turning on an engine of a vehicle. The system includes an engine vibration sensor connected to the engine and configured to detect vibration data. The system includes an engine shock dampening unit configured to analyze the vibration data received from the engine vibration sensor to detect the engine shock event. The engine shock dampening unit is further configured to determine a vibration cancellation instruction for partially or completely cancelling the vibration from the engine shock event when the engine shock event is detected. The system includes a vibration unit configured to vibrate in an opposing direction of the vibration from the engine shock event based on the vibration cancellation instruction such that the vibration from the engine shock event is reduced.

Also described is a vehicle. The vehicle includes an engine causing an engine shock event when turned on. The vehicle also includes an engine vibration sensor connected to the engine and configured to detect vibration data. The vehicle also includes an engine shock dampening unit configured to determine a vibration waveform based on the vibration data. The engine shock dampening unit is also configured to analyze the vibration data received from the engine vibration sensor to detect the engine shock event. The engine shock dampening unit is also configured to determine a vibration cancellation instruction for partially or completely cancelling the vibration from the engine shock event when the engine shock event is detected. The vehicle also includes a vibration unit configured to vibrate in an opposing direction of the vibration from the engine shock event based on the vibration cancellation instruction such that the vibration from the engine shock event is reduced.

Also described is a method for reducing vibration from an engine shock event caused by turning on an engine of a vehicle. The method includes detecting, by an engine vibration sensor, vibration data. The method also includes analyzing, by an engine shock dampening unit, the vibration data received from the engine vibration sensor to detect the engine shock event. The method also includes determining, by the engine shock dampening unit, a vibration cancellation instruction for partially or completely cancelling the vibration from the engine shock event when the engine shock event is detected. The method also includes vibrating, by a vibration unit, in an opposing direction of the vibration from the engine shock event based on the vibration cancellation instruction such that the vibration from the engine shock event is reduced.

BRIEF DESCRIPTION OF THE DRAWINGS

Other systems, methods, features, and advantages of the invention will be or will become apparent to one of ordinary skill in the art upon examination of the following figures and detailed description. It is intended that all such additional systems, methods, features, and advantages be included within this description, be within the scope of the invention, and be protected by the accompanying claims. Component parts shown in the drawings are not necessarily to scale, and may be exaggerated to better illustrate the important features of the invention. In the drawings, like reference numerals designate like parts throughout the different views, wherein:

FIG. 5A illustrates a graph of a detected engine shock event, according to an embodiment of the invention;

FIG. 5B illustrates a graph of a detected vibration that is not an engine shock event, according to an embodiment of the invention;

DETAILED DESCRIPTION

Disclosed herein are systems and methods for reducing movement or vibration from an engine shock event caused by turning on an engine of a vehicle. The systems and methods of reducing the vibration provide several benefits and advantages, such as providing a more comfortable experience for occupants of the vehicle. Significant G-forces may be experienced by an occupant of the vehicle when an engine shock event occurs. By dampening the vibrations from an engine shock event, a more pleasant driving experience may be provided. In addition, experiencing an engine shock event may be disconcerting for a driver, even though there may be no actual damage or harm to the vehicle. By dampening the vibrations from the engine shock event, potential concern regarding the operational integrity of the vehicle may be avoided. A driver who is not distracted by a potential issue with the vehicle may be able to operate the vehicle in a safer manner.

In an example embodiment, a hybrid vehicle is travelling and is powered by the motor, which is powered by a battery. The state of charge of the battery may fall below a minimum threshold, so the engine is turned on. A driver of a vehicle without the engine shock dampening system may experience an engine shock event when the engine is turned on. The driver may experience significant movement or vibration forcing the driver back and forth in the driver's seat. The driver may also hear a loud audible noise from the drivetrain of the vehicle. At this point, at minimum, the driver is uncomfortable, having experienced the significant movement or vibration caused by the engine shock event. Potentially more concerning is that the driver is now distracted with apprehension over the functioning of the vehicle. A driver of a vehicle with the engine shock dampening system is both more comfortable and less distracted than the driver of the vehicle without the engine shock dampening system.

An exemplary system includes an engine vibration sensor connected to the engine and configured to detect vibration data. The system also includes an engine shock dampening unit configured to analyze the vibration data received from the engine vibration sensor to detect the engine shock event. The engine shock dampening unit is further configured to determine a vibration cancellation instruction for partially or completely cancelling the vibration from the engine shock event when the engine shock event is detected. The system also includes a vibration unit configured to vibrate in an opposing direction of the vibration from the engine shock event based on the vibration cancellation instruction such that the vibration from the engine shock event is reduced.

Figure 1:
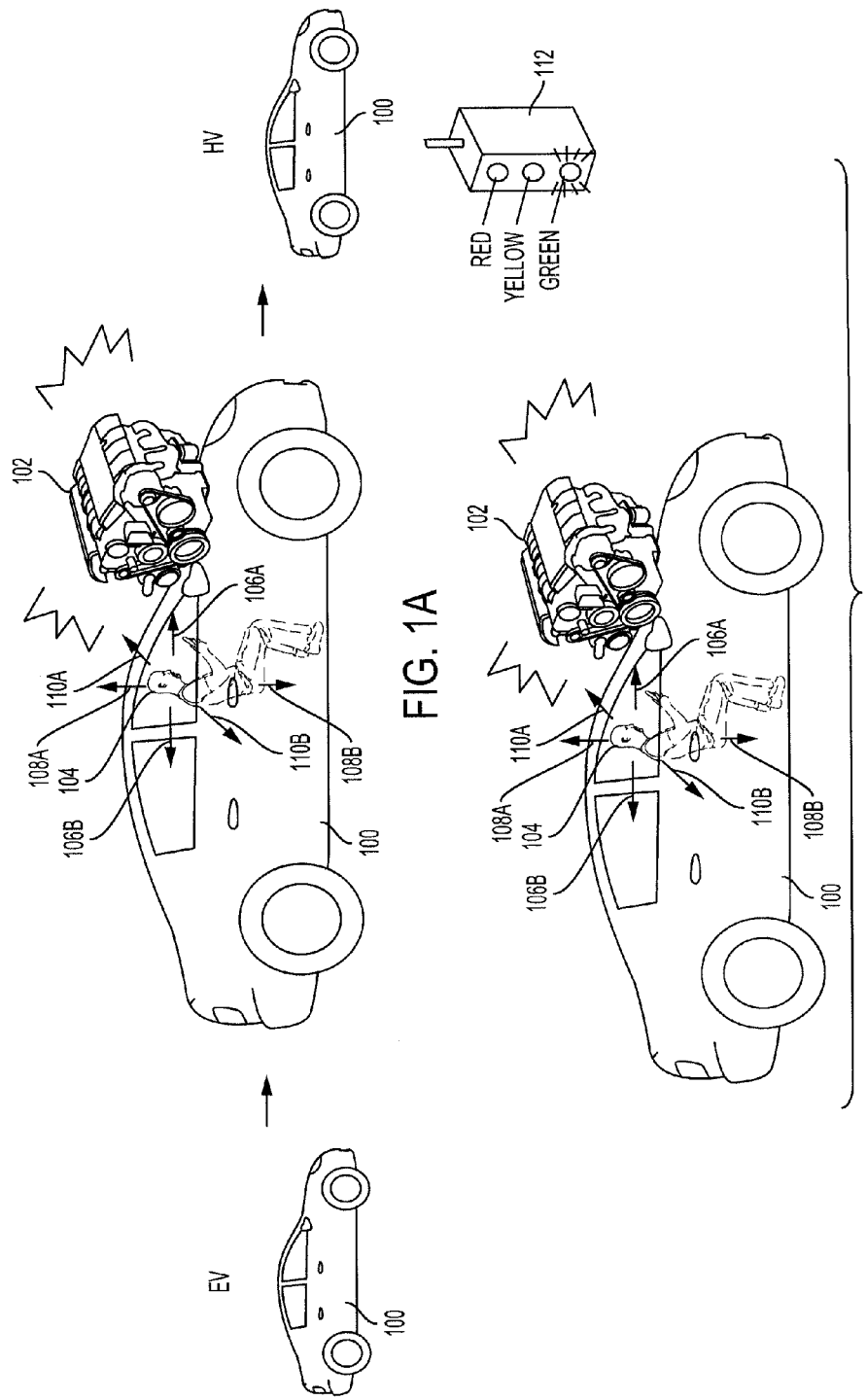
FIG. 1A illustrates a vehicle experiencing an engine shock event when transitioning from an electric vehicle mode to a hybrid vehicle mode, according to an embodiment of the invention.
FIG. 1B illustrates a vehicle experiencing the engine shock event when turning on the engine, according to an embodiment of the invention.

FIG. 1A illustrates a vehicle 100 experiencing an engine shock event when transitioning from an electric vehicle mode to a hybrid vehicle mode. The vehicle 100 may be an electric vehicle, an internal combustion engine vehicle, a hybrid vehicle, a fuel cell vehicle, or any combination thereof. The vehicle 100 may be a vehicle operated by an individual, operated semi-autonomously or fully autonomously, operated remotely, or any combination thereof. As used herein, "driver," "user," or "operator" may refer to a human being driving vehicle 100 when vehicle 100 is a non-autonomous vehicle or operating in a non-autonomous mode. "Driver," "user," or "operator" may also refer to a computing system or control unit controlling the operation of the vehicle 100 when the vehicle 100 is a semi-autonomous or a fully autonomous vehicle.

When the vehicle 100 is a hybrid vehicle having an engine and a motor, the vehicle 100 may experience an engine shock event when the vehicle 100 transitions from an electric vehicle mode to a hybrid vehicle mode. In the electric vehicle mode, the vehicle 100 may be powered by a motor powered by electricity stored in a battery. In the hybrid vehicle mode, the vehicle 100 may additionally be powered by an internal combustion engine powered by gasoline stored in a fuel tank. The vehicle 100 may transition from the electric vehicle mode to the hybrid vehicle mode when the state of charge of the battery falls below a threshold level of charge, and the engine may assist in recharging the battery. The vehicle 100 may transition from the electric vehicle mode to the hybrid vehicle mode when an increase in acceleration demand is requested by the driver.

As a result of the transition from the electric vehicle mode to the hybrid vehicle mode, the engine 102 is started. When the engine 102 is started, the engine 102 may cause an engine shock event. The engine shock event may be caused when an engine starter turning a crankshaft of the engine 102 creates vibration or causes movement. The vibration or movement may be felt by an occupant 104 of the vehicle 100. The occupant 104 may experience a frontward force 106A in a direction to the front of the occupant 104, a rearward force 106B in a direction to the rear of the occupant 104, an upward force 108A in a direction above the occupant 104, a downward force 108B in a direction below the occupant 104, a leftward force 110A in a direction to the left of the occupant 104, a rightward force 110B in a direction to the right of the occupant 104, or any combination thereof. The various forces may be expressed as positive and negative values, with the occupant 104 being the origin in a three dimensional space. For example, an engine shock event causing rearward and downward force on the occupant 104 may be expressed as a negative value on a front-rear axis 106 and a negative value on an up-down axis 108.

In addition, the engine shock event may be an oscillating vibration over time, in one or more directions. For example, the engine shock event may cause the occupant 104 to experience an alternating frontward force 106A and rearward force 106B over a period of time. Once the engine 102 operation is stabilized, the engine vibrations may no longer be felt or may not longer be intense enough to be noticeable, and the engine shock event may be over.

FIG. 1B illustrates the vehicle 100 experiencing an engine shock event when starting the engine 102 at a traffic light 112. The vehicle 100 may be a hybrid vehicle which transitions from the electric vehicle mode to the hybrid vehicle mode when resuming operation of the vehicle 100 after idling. The vehicle 100 may turn off the engine 102 when idling, to improve fuel efficiency and reduce emissions, and may turn the engine 102 back on when the driver resumes operation of the vehicle 100.

The vehicle 100 may be an internal combustion engine vehicle which turns off the engine 102 when the vehicle 100 comes to a complete stop and is idling. Upon the traffic light 112 turning green and the driver depressing the accelerator pedal, the engine 102 may be started and may cause an engine shock event. As in FIG. 1A, the occupant 104 in FIG. 1B may experience a frontward force 106A in a direction to the front of the occupant 104, a rearward force 106B in a direction to the rear of the occupant 104, an upward force 108A in a direction above the occupant 104, a downward force 108B in a direction below the occupant 104, a leftward force 110A in a direction to the left of the occupant 104, a rightward force 110B in a direction to the right of the occupant 104, or any combination thereof.

Figure 2:
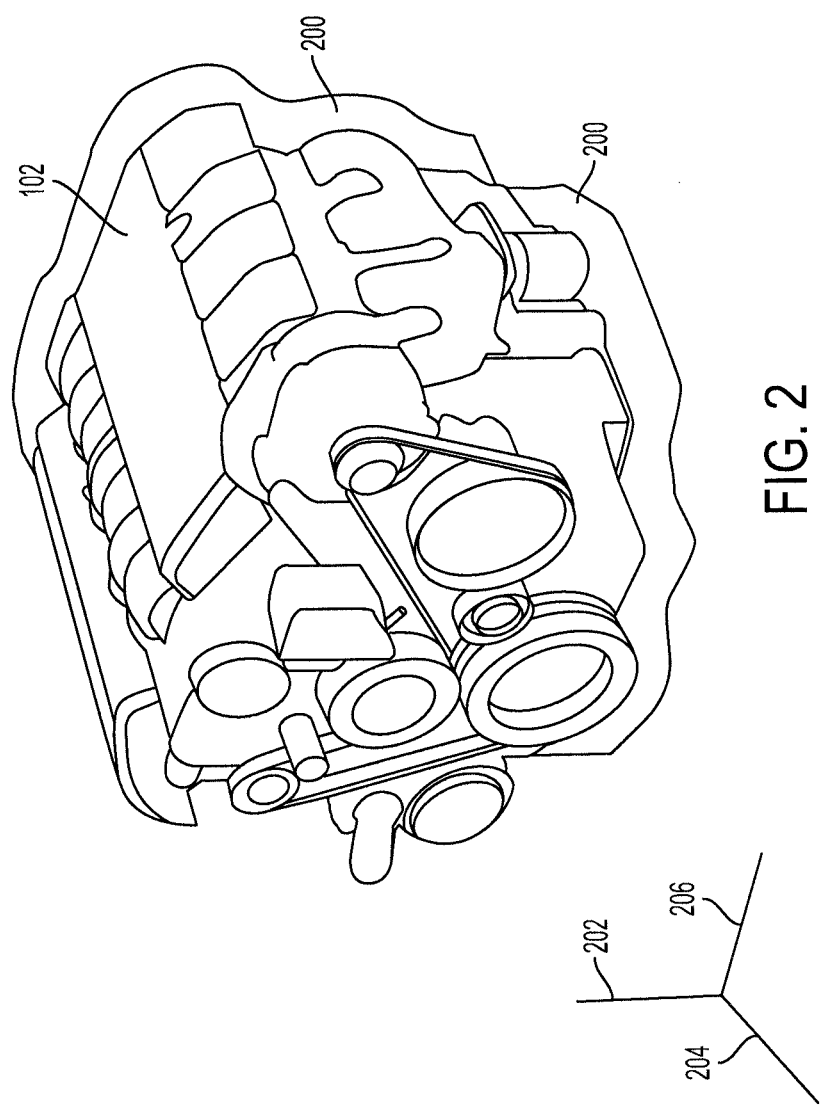
FIG. 2 illustrates the engine and an engine shock dampening platform, according to an embodiment of the invention.

FIG. 2 illustrates the engine 102 and an engine shock dampening platform 200. The engine shock dampening platform 200 may be an enclosed unit housing one or more components of the engine shock dampening system, as described herein. The engine shock dampening platform 200 may be attached to the engine 102. The engine shock dampening platform 200 may be located below the engine 102, on a side of the engine 102, or a combination of below the engine 102 and on a side of the engine 102. The engine shock dampening platform 200 may have dimensions similar to a side of the engine 102 the engine shock dampening platform 200 is attached to. For example, when the engine shock dampening platform 200 is attached to the side of the engine 102, the engine shock dampening platform 200 may have a height and width similar to a height and width of the side of engine 102. When the engine shock dampening platform 200 is attached below the engine 102, the engine shock dampening platform 200 may have a width and length similar to the width and length of the bottom of engine 102.

Being below the engine 102 may assist the engine shock dampening platform 200 in absorbing force in a vertical axis 202, and being on a side of the engine 102 may assist the engine shock dampening platform 200 in absorbing force in a front-back axis 204. However, even when the engine shock dampening platform 200 is located on only the bottom of the engine 102 or the side of the engine 102, the vibration unit may include multiple actuators configured to generate force in multiple directions, such that engine vibrations in any direction caused by the engine shock event may be effectively cancelled by the engine shock dampening platform 200.

The engine shock dampening platform 200 may dampen vibrations from the engine 102 passively or actively. The engine shock dampening platform 200 may provide a passive dampening by absorbing a portion of the vibrations from the engine 102. The engine shock dampening platform 200 may be made of materials which absorb shock, and may have components, such as shock absorbers, which absorb shock. For example, the engine shock dampening platform 200 may be made of a foam material capable of absorbing shock. In another example, the engine shock dampening platform 200 is made of a lightweight aluminum or hard plastic, and is connected to the engine 102 by shock absorbers.

The engine shock dampening platform 200 may also include components of the engine shock dampening system for actively dampening the vibrations from the engine 102 during an engine shock event. As described herein, the engine shock dampening system may include a vibration unit configured to vibrate in a direction opposite the vibrations from the engine 102, such that the vibrations from the engine shock event are reduced. Active dampening of the vibrations from the engine shock event may be more effective at reducing effects of engine shock than systems designed to position the crankshaft at a particular position when the engine is turned off. Any inaccuracy in execution of those systems may result in the failure to prevent the engine shock event.

Figure 3:
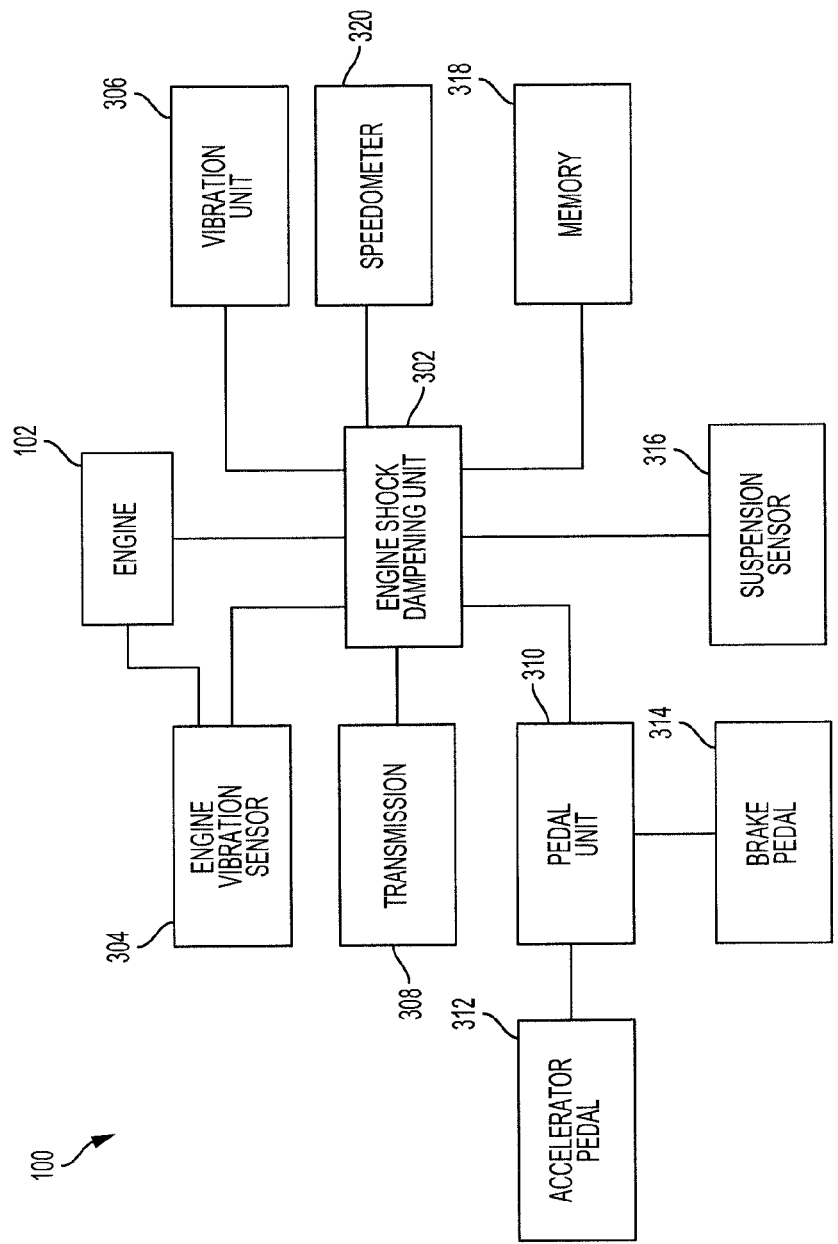
FIG. 3 illustrates a block diagram of the vehicle, according to an embodiment of the invention.

FIG. 3 illustrates a block diagram of the engine shock dampening system. The system may include the vehicle 100. The vehicle 100 includes an engine 102, an engine shock dampening unit 302, an engine vibration sensor 304, a vibration unit 306, a transmission 308, a pedal unit 310 connected to an accelerator pedal 312 and a brake pedal 314, a suspension sensor 316, a memory 318, and a speedometer 320, for example. In some embodiments, the engine shock dampening unit 302, the engine vibration sensor 304, the vibration unit 306, and/or the memory 318 are located in the engine shock dampening platform 200.

The engine vibration sensor 304 is connected to the engine 102 and the engine shock dampening unit 302. The engine vibration sensor 304 is configured to detect vibration data from the engine 102. The engine vibration sensor 304 may be any sensor configured to detect force in one or more directions, such as an inertial measurement unit or an accelerometer. The engine vibration sensor 304 communicates the detected vibration data to the engine shock dampening unit 302.

Figure 4:
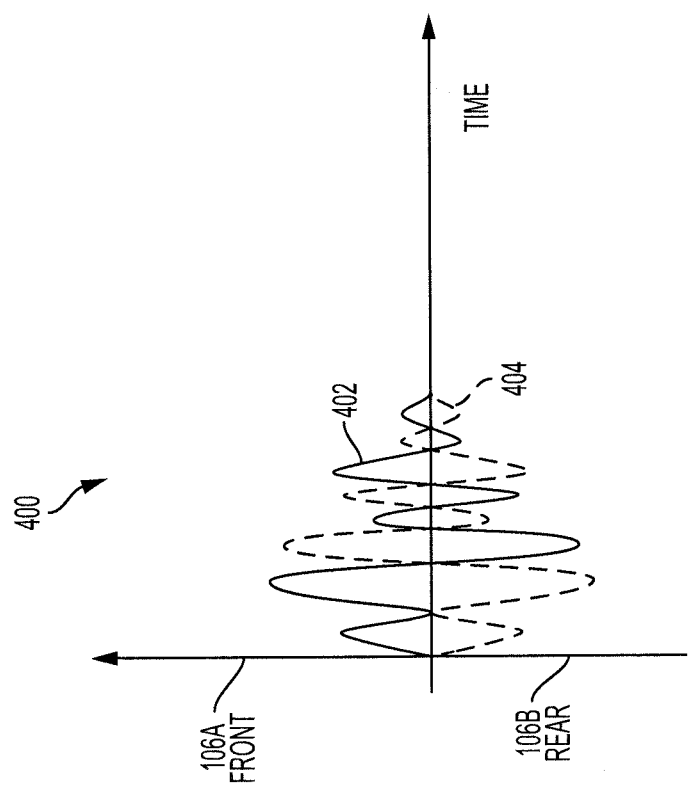
FIG. 4 illustrates a graph of a vibration unit output in response to detecting the engine shock event, according to an embodiment of the invention.

The engine shock dampening unit 302 receives the detected vibration data from the engine vibration sensor 304 and detects a vibration based on the vibration data. In some embodiments, the vibration data is a series of data points which, when plotted on a graph, form a curve. FIG. 4 illustrates a graph 400 including a curve 402 based on the vibration data. The curve 402 indicates movement in the frontward direction 106A and the rearward direction 106B. The oscillating nature of the curve 402 indicates a vibration.

The engine shock dampening unit 302 analyzes the vibration data received from the engine vibration sensor 304 to detect an engine shock event. When the engine shock dampening unit 302 detects the engine shock event, the engine shock dampening unit 302 determines a vibration cancellation instruction for partially or completely cancelling the vibration from the engine shock event. The vibration cancellation instruction may be a series of vibration directions and vibration magnitudes to be executed by the vibration unit 306.

The vibration unit 306 is connected to the engine shock dampening unit 302 and is configured to receive a vibration cancellation instruction from the engine shock dampening unit 302. The vibration unit 306 is configured to vibrate in an opposing direction of the detected vibration from the engine 102 based on the vibration cancellation instruction, such that the detected engine vibration is reduced.

The engine shock dampening unit 302 may not detect an engine shock event in all cases where vibration data is detected. In some situations, it may not be desirable to dampen a detected vibration. For example, when the vibration is caused by the driver increasing engine speed of the engine 102 to quickly accelerate, dampening the vibration caused by the engine may reduce driver feel for the vehicle 100. In another example, when the vibration is caused by the road the vehicle 100 is traveling on, dampening the vibration may also reduce driver feel for the vehicle 100. This may be particularly true when the vehicle 100 travels over rumble strips on the road, which are raised or depressed portions of the road, whereby driving over the rumble strip causes an audible sound and vibration of the steering wheel. The rumble strips may be located on a shoulder of a road, and may serve as a safety mechanism to alert the driver when the vehicle 100 is too close to the side of the road. Further, outputting a vibration using the vibration unit 306 when the detected vibration data is not caused by the engine 102 may undesirably result in additional vibration being created by the vibration unit 306, as there is no corresponding engine vibration to cancel out.

The engine shock dampening unit 302 may use vibration data as well as data received from the transmission 308, the pedal unit 310, the engine 102, the suspension sensor 316, and the speedometer 320, for example, to detect the engine shock event.

The transmission 308 is connected to the engine shock dampening unit 302 and is configured to communicate transmission data to the engine shock dampening unit 302. The transmission data indicates a transmission mode of the vehicle 100, such as park, drive, neutral, or reverse.

The pedal unit 310 is connected to the engine shock dampening unit 302 and is configured to detect pedal data and communicate the pedal data to the engine shock dampening unit 302. The pedal data may be associated with the accelerator pedal 312 and/or the brake pedal 314. The pedal data may indicate a level of engagement of the accelerator pedal 312 and/or the brake pedal 314. The level of engagement may be expressed in terms of a value associated with engagement, such as 2 for light engagement or 10 for heavy engagement of the accelerator pedal 312 or the brake pedal 314. The level of engagement may be expressed in terms of a percentage depression of the accelerator pedal 312 or the brake pedal 314, such as 0% for no pedal engagement and 100% for maximum pedal engagement.

The suspension sensor 316 is connected to the engine shock dampening unit 302 and is configured to detect suspension data and communicate the suspension data to the engine shock dampening unit 302. The suspension data may indicate a suspension variance associated with the vehicle 100. The suspension variance may be associated with a bumpiness or a smoothness of the surface the vehicle 100 is traveling on. For example, when the vehicle 100 is traveling on a smooth surface, the suspension variance may be low, and when the vehicle 100 is traveling on a bumpy surface, the suspension variance may be high.

The memory 318 is connected to the engine shock dampening unit 302 and is configured to store values of thresholds described herein, such as an amplitude threshold, period threshold, threshold level of charge, vehicle speed threshold, or instability threshold.

FIG. 4 illustrates the vibration data associated with an engine shock event and the cancellation of the vibration associated with the engine shock event. The curve 402 may be associated with the vibration data associated with the engine shock event and the curve 404 may be associated with the vibration cancellation instruction. When combined, the curve 404 may partially or completely cancel the curve 402. The vibration cancellation instruction causes the vibration unit 306 to output vibrations of the same magnitude, but in the opposite direction of the vibration from the engine shock event. For example, when the curve 402 indicates a frontward force 106A of 0.04 Gs is detected, the curve 404 indicates a rearward force 106B of 0.04 Gs is output by the vibration unit 306 to oppose the frontward force 106A. The vibration data is detected in real-time, and the vibration cancellation instruction is also determined in real-time, responsive to the detected vibration data. In some embodiments, there may be a lag between when the engine shock event is detected, and when the vibration associated with the engine shock event are cancelled by the vibration unit 306. The driver or other occupants may experience brief discomfort during the lag time, but the remaining vibration is reduced.

In some embodiments, the engine shock dampening unit 302 may store detected waveforms of engine shock events (e.g., curve 402) in the memory 318. The engine shock dampening unit 302 may analyze the stored waveforms to determine whether the waveform representing the engine shock event is common across some or all of the instances of the engine shock events. When the engine shock events result in consistent vibration waveforms, the engine shock dampening unit 302 may communicate the same vibration cancellation instruction to the vibration unit 306 each time an engine shock event is detected. Analyzing past waveforms to predict future waveforms may be used in addition to or in lieu of real-time determination of the vibration cancellation instruction based on the detected vibration data.

The engine shock dampening unit 302 may analyze the vibration data to detect the engine shock event. As compared to vibration created from accelerating, vibration from the engine shock event may greater in magnitude and shorter in time. Accordingly, the engine shock dampening unit 302 may detect the engine shock event by determining a vibration waveform based on the vibration data and detecting the engine shock event when an amplitude of the vibration waveform exceeds an amplitude threshold or a period of the vibration waveform is less than a period threshold.

Further, the engine shock dampening unit 302 may detect the engine shock event within an engine shock time window. The engine shock time window may be a period of time in which an engine shock event is likely to occur. For example, the engine shock time window may be one minute after the engine is turned on or may be one minute after a state of charge of the battery falls below a threshold level of charge. In another example, the engine shock time window may be at a relatively consistent time into any given trip, such that an engine shock event may occur between 10 minutes and 15 minutes after the vehicle has been turned on and operated. The engine shock time window may be predetermined and may have a margin of, for example, plus or minus 10 percent. When vibration data is detected outside of the engine shock time window, the engine shock dampening unit 302 may be less likely to detect an engine shock event.

FIG. 5A illustrates a graph of a detected engine shock event. The vibration waveform determined by the engine shock dampening unit 302 based on the vibration data is illustrated as the curve 502. According to the curve 502, the detected engine shock event causes alternating forces in the frontward direction 106A and the rearward direction 106B. The strongest force exerted by the engine shock event at any time is represented by the amplitude 506. The duration of the engine shock event is represented by the period 504. The engine shock dampening unit 302 may analyze the vibration data represented by the curve 502 to detect the engine shock event. The engine shock dampening unit 302 may compare the amplitude 506 to the positive amplitude threshold 508A and/or the negative amplitude threshold 508B. When the amplitude 506 exceeds the positive amplitude threshold 508A or the negative amplitude threshold 508B, the engine shock dampening unit 302 may detect the engine shock event. Alternatively, or in addition, the engine shock dampening unit 302 may compare the period 504 to the period threshold 510. When the period 504 is less than the period threshold 510, the engine shock dampening unit 302 may detect the engine shock event.

FIG. 5B illustrates a graph of a detected vibration that is not an engine shock event. The vibration waveform determined by the engine shock dampening unit 302 based on the vibration data is illustrated as curve 552. According to curve 552, the detected vibration causes alternating forces in the front direction 106A and the rear direction 106B, similar to curve 502. The strongest force exerted by the detected vibration at any time is represented by the amplitude 556 and the duration of the detected vibration is represented by the period 554. The engine shock dampening unit 302 may analyze the vibration data represented by the curve 552. The engine shock dampening unit 302 may compare the amplitude 556 to the positive amplitude threshold 508A and/or the negative amplitude threshold 508B. Unlike the amplitude 506 of the curve 502, the amplitude 556 of the curve 552 does not exceed the positive amplitude threshold 508A or the negative amplitude threshold 508B. Accordingly, the engine shock dampening unit 302 may not detect the engine shock event. Alternatively, or in addition, the engine shock dampening unit 302 may compare the period 554 to the period threshold 510. Unlike the period 504 of the curve 502, the period 554 of the curve 552 exceeds the period threshold 510. Accordingly, the engine shock dampening unit 302 may not detect the engine shock event.

The engine shock dampening unit 302 may analyze a curve associated with the vibration data to determine a degree of instability. When the degree of instability associated with the vibration data exceeds an instability threshold, the engine shock dampening unit 302 may detect the engine shock event. The degree of instability may be measured by an amount of change in force over a period of time. The degree of instability may incorporate aspects of the period and the amplitude. For example, the engine shock dampening unit 302 may determine a degree of instability of the curve 502 as being 55 and the degree of instability of the curve 552 as being 21. If the instability threshold is 40, the engine shock dampening unit 302 detects an engine shock event for the vibration data associated with the curve 502, but not an engine shock event for the vibration data associated with the curve 552.

While the frontward force 106A and the rearward force 106B are illustrated in FIGS. 4, 5A, and 5B, any combination of forces may be analyzed to detect the engine shock event.

Figure 6A:
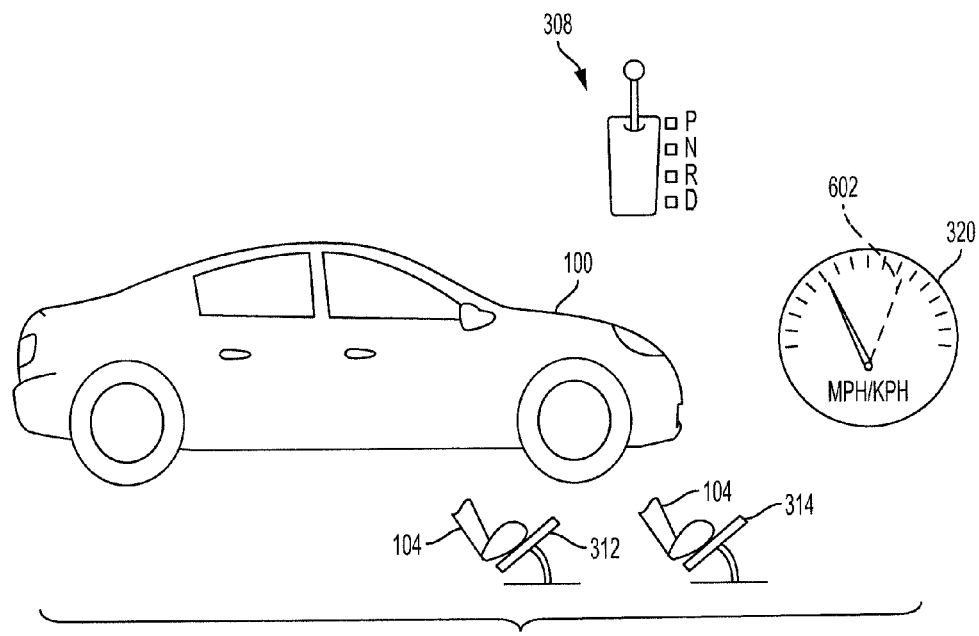
FIG. 6A illustrates determining whether the detected vibration is an engine shock event based on transmission mode, pedal position and/or vehicle speed, according to an embodiment of the invention.

FIG. 6A illustrates determining whether the detected vibration is an engine shock event based on transmission state, pedal position and/or vehicle speed.

The engine shock dampening unit 302 may analyze the vibration data based on the transmission mode to detect an engine shock event. The transmission mode may be received by the engine shock dampening unit 302 from the transmission 308. When the vehicle 100 is in park or neutral, and the engine vibration sensor 304 detects vibration data, the source of the vibration data is likely the engine 102, as there are likely no other sources of vibration (e.g., from driving over uneven surfaces). Further, when the vehicle 100 is in park or neutral, the detected vibration data may more likely be from the engine 102 turning on, which is the cause of the engine shock event.

When the vehicle 100 is in reverse or drive, and the engine vibration sensor 304 detects vibration data, the source of the vibration data may be the engine 102 turning on and causing an engine shock event, or the source of the vibration data may be the engine 102 operating at an engine speed high enough to cause engine vibration. However, when the vehicle 100 is in reverse, it may not be likely that the engine 102 is operating at a sufficiently high engine speed to cause engine vibration. Thus, when the engine vibration sensor 304 detects vibration data and the transmission data from the transmission 308 indicates the vehicle 100 is in reverse, the engine shock dampening unit 302 may detect an engine shock event. In some embodiments, a sufficiently high engine speed to cause vibration is an engine speed exceeding 4,000 rotations per minute.

When the engine vibration sensor 304 detects vibration data and the transmission data from the transmission 308 indicates the vehicle 100 is in drive, the engine shock dampening unit 302 may detect the engine shock event based on vehicle speed data received from the speedometer 320 in addition to the vibration data and the transmission data. The vehicle speed data indicates the speed of the vehicle 100, and when the vehicle speed is less than a vehicle speed threshold, the engine shock dampening unit 302 may detect the engine shock event, as vibration data detected when the vehicle speed is relatively low may likely be caused by the engine 102 being turned on, thus causing the engine shock event. When the vehicle 100 is travelling at a sufficiently high speed, vibrations from the engine, the driving surface, and/or other engine components may be magnified. Thus, when the vehicle speed exceeds a vehicle speed threshold 602, the engine shock dampening system may not be able to reliably detect an engine shock event. Thus, when the vehicle speed exceeds the vehicle speed threshold 602, it may be more likely that the detected vibration data was caused by a source other than an engine shock event, and should not be dampened. In some embodiments, the vehicle speed threshold is 20 miles per hour.

The engine shock dampening unit 302 may also detect an engine state based on engine state data received from the engine 102. The engine 102 may provide engine state data indicating whether the engine 102 is in an on state or an off state. For example, when the vehicle 100 is a hybrid vehicle and the vehicle 100 transitions from an electric vehicle mode to a hybrid vehicle mode, the engine 102 may communicate, to the engine shock dampening unit 302, the engine state data indicating that the engine is in an on state.

The engine shock dampening unit 302 may detect the engine shock event based on an analysis of the vibration data as well as the engine state data. When the engine state data indicates that the engine is in an off state, the engine shock dampening unit 302 may not detect the engine shock event, as the engine 102 is unable to create vibrations in the off state. In those situations, the vibration data may be from a source other than the engine 102.

The pedal data may be used to detect the engine shock event. The detected vibration may not be an engine shock event when the detected vibration is caused by engine vibrations responsive to swift acceleration or engine vibrations responsive to swift braking. For example, the vehicle 100 may be traveling and the driver 104 may swiftly engage the accelerator pedal 312. The swift engagement of the accelerator pedal 312 may cause an engine vibration as the engine speed increases. The engine vibration caused therefrom may be detected by the engine vibration sensor 304. However, it may not be desirable to dampen this engine vibration, as doing so may reduce the driver's 104 feel and responsiveness of the vehicle 100. Similarly, swift engagement of the brake pedal 314 may cause a vibration from the brakes, which may be detected by the engine vibration sensor 304. However, it may not be desirable to dampen this brake vibration, as doing so may reduce the driver's 104 feel of the vehicle 100. Further, outputting a vibration using the vibration unit 306 when there is no engine vibration may result in vibration being created instead of cancelled, by the vibration unit 306.

Accordingly, the engine shock dampening unit 302 may compare the accelerator pedal position data received from the pedal unit 310 with an accelerator pedal position threshold stored on the memory 318. When the accelerator pedal position data indicates that the accelerator pedal position is less than the accelerator pedal position threshold and the engine vibration sensor 304 detects vibration data, the engine shock dampening unit 302 detects the engine shock event. Similarly, the engine shock dampening unit 302 may compare the brake pedal position data received from the pedal unit 310 with a brake pedal position threshold stored in the memory 318. When the brake pedal position data indicates that the brake pedal position is less than the brake pedal position threshold and the engine vibration sensor detects vibration data, the engine shock dampening unit 302 detects the engine shock event.

Figure 6B:
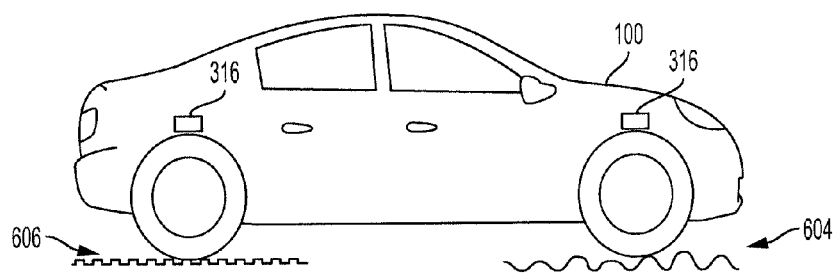
FIG. 6B illustrates determining whether the detected vibration is an engine shock event based on suspension data, according to an embodiment of the invention.

FIG. 6B illustrates determining whether the detected vibration is an engine shock event based on the suspension data. The suspension sensor 316 is configured to detect suspension data and communicate the suspension data to the engine shock dampening unit 302. The suspension data may indicate a suspension variance associated with the vehicle 100. As described herein, the suspension variance may be greater when the vehicle 100 is traveling over a rough surface, such as rugged terrain 604 or rumble strip 606. When the vehicle 100 is traveling over a surface causing increased suspension variance, the vibration data may be detected by the engine vibration sensor 304, but detecting an engine shock event may not be detected, as dampening the vibration may result in reduced feel of the vehicle 100. In addition, outputting vibration from the vibration unit 306 with no corresponding engine vibration may create additional vibration, as there is no engine vibration corresponding to the output of the vibration unit 306.

Figure 7:
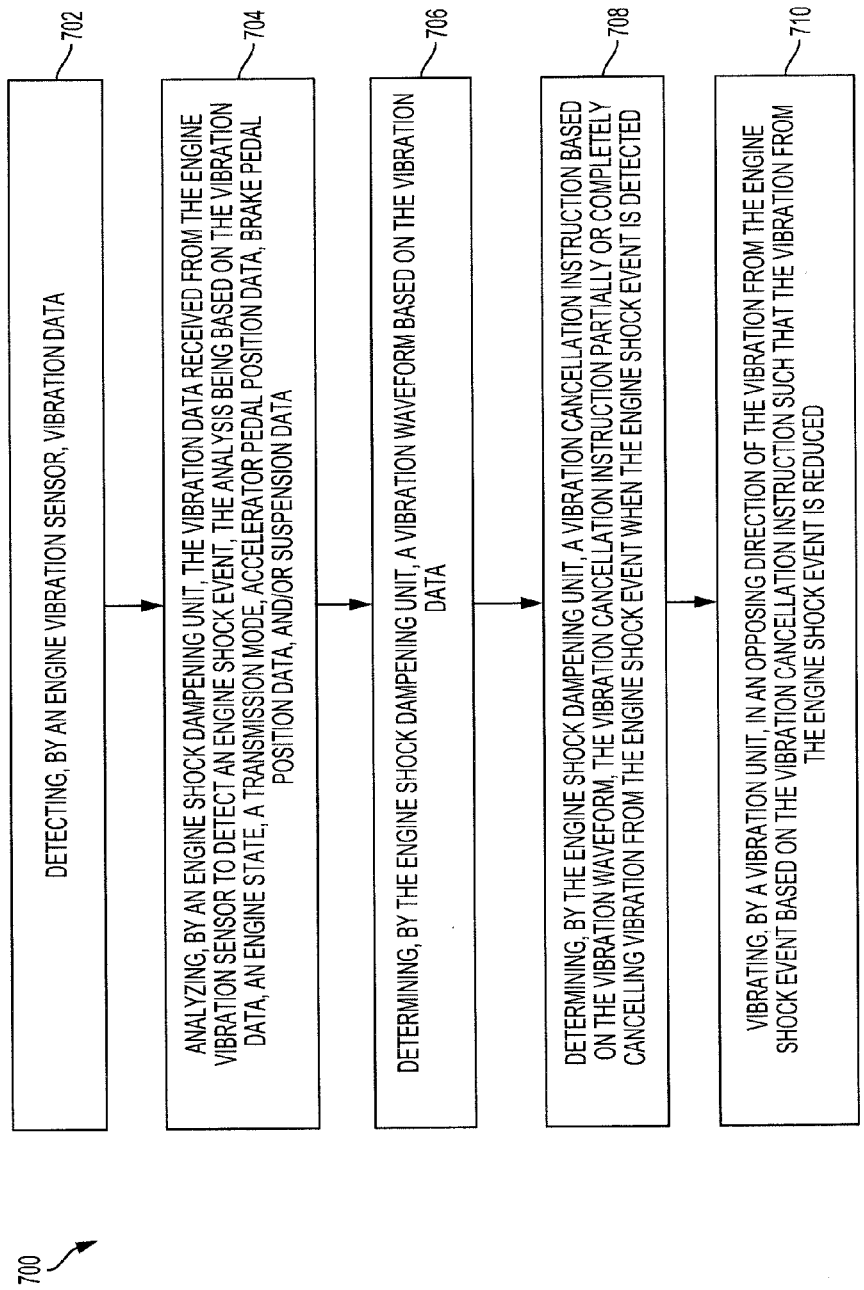
FIG. 7 illustrates an example of a flowchart describing the collision alert system, according to an embodiment of the invention.

FIG. 7 illustrates an example of a flowchart describing a process 700 of reducing vibration from an engine shock event caused by turning on an engine 102 in a vehicle 100.

An engine vibration sensor 304 detects vibration data (step 702). The engine vibration sensor 304 may be connected to the engine 102 and may be located within an engine dampening platform 200. The engine vibration sensor 304 communicates the vibration data to the engine shock dampening unit 302.

The engine shock dampening unit 302 analyzes the vibration data received from the engine vibration sensor 304 to detect an engine shock event (step 704). The analysis of the vibration data to detect the engine shock event may be based on at least one of: the vibration data, an engine state, a transmission mode, accelerator pedal position data, brake pedal position data, and/or suspension data.

The engine shock dampening unit 302 may determine a vibration waveform based on the vibration data. The vibration waveform may have an amplitude and a period, and when the amplitude exceeds an amplitude threshold and/or when the period is less than a period threshold, the engine shock dampening unit 302 may detect the engine shock event.

The engine shock dampening unit 302 may detect the engine shock event when the engine state indicates that the engine 102 transitions from an off state to an on state. Transitioning from the off state to the on state may cause the engine shock event. The engine state may be provided by the engine 102 and received by the engine shock dampening unit 302.

The engine shock dampening unit 302 may detect the engine shock event when the vibration data is detected and the transmission mode data indicates the vehicle 100 is in park, neutral, or reverse. When the vehicle 100 is in park, neutral, or reverse, the detected vibration data may not likely be caused by the engine 102 operating at high speeds or the vehicle 100 travelling over uneven surfaces. The engine shock dampening unit 302 may receive the transmission mode data from the transmission 308.

The engine shock dampening unit 302 may detect the engine shock event when the vibration data is detected and the transmission mode data indicates the vehicle 100 is in drive and the vehicle speed data indicates the vehicle speed is less than a vehicle speed threshold. When the vehicle 100 is in drive, but the vehicle 100 is travelling at relatively low speeds, the detected vibration data may not likely be caused by the engine 102 operating at high speeds. The engine shock dampening unit 302 may receive the vehicle speed data from the speedometer 320.

The engine shock dampening unit 302 may detect the engine shock event when vibration data is detected and the accelerator pedal position data indicates an accelerator pedal position less than an accelerator pedal position threshold. When the driver of the vehicle 100 is not accelerating at a relatively high rate, the detected vibration data may not likely be caused by the engine 102 operating at high speeds. The engine shock dampening unit 302 may receive the accelerator pedal position data from the pedal unit 310.

The engine shock dampening unit 302 may detect the engine shock event when the vibration data is detected and the brake pedal position data indicates a brake pedal position less than a brake pedal position threshold. When the driver of the vehicle 100 is not braking at a relatively high rate, the detected vibration data may not likely be caused by vibrations from the brakes. The engine shock dampening unit 302 may receive the brake pedal position data from the pedal unit 310.

The engine shock dampening unit 302 may detect the engine shock event when vibration data is detected and the suspension data indicates a suspension variance less than a suspension variance threshold. When the suspension variance is relatively low, the vibration data detected by the engine vibration sensor 304 may not be caused by the vehicle 100 driving over uneven surfaces. The engine shock dampening unit 302 may receive the suspension data from the suspension sensor 316.

During the analysis of the vibration data or after the analysis of the vibration data, the engine shock dampening unit 302 determines a vibration waveform based on the vibration data (step 706). The vibration waveform may be a curve associated with the vibration data.

When the engine shock event is detected, the engine shock dampening unit 302 determines a vibration cancellation instruction based on the vibration waveform, where the vibration cancellation instruction partially or completely cancels vibration from the engine shock event (step 708). The vibration cancellation instruction may be represented by a waveform having the same amplitude as the vibration waveform, but an inverted phase of the vibration waveform. The engine shock dampening unit 302 communicates the vibration cancellation instruction to the vibration unit 306.

The vibration unit 306 receives the vibration cancellation instruction and outputs vibration in an opposing direction of the vibration from the engine shock event (step 710). The output from the vibration unit 306 is based on the vibration cancellation instruction. By outputting the vibration, the vibration unit 306 reduces the vibration from the engine shock event.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that the scope shall not be restricted, except in light of the appended claims and their equivalents.

What is claimed is:

1. A system for reducing vibration from an engine shock event caused by turning on an engine of a vehicle, the system comprising:
   an engine vibration sensor connected to the engine and configured to detect vibration data;
   an engine shock dampening unit configured to:
      analyze the vibration data received from the engine vibration sensor to detect the engine shock event, and
      determine a vibration cancellation instruction for partially or completely cancelling the vibration from the engine shock event when the engine shock event is detected; and
   a vibration unit configured to vibrate in an opposing direction of the vibration from the engine shock event based on the vibration cancellation instruction such that the vibration from the engine shock event is reduced.

2. The system of claim 1, wherein determining the vibration cancellation instruction comprises determining a vibration waveform based on the vibration data, and determining a cancelling waveform having a same amplitude as the vibration waveform and an inverted phase of the vibration waveform.

3. The system of claim 1, wherein analyzing the vibration data to detect the engine shock event comprises determining a vibration waveform based on the vibration data, and detecting the engine shock event when an amplitude of the vibration waveform exceeds an amplitude threshold or a period of the vibration waveform is less than a period threshold.

4. The system of claim 1, wherein the engine shock dampening unit is further configured to detect an engine state based on engine state data received from the engine, and detect the engine shock event when the engine state transitions from an off state to an on state.

5. The system of claim 1, wherein the engine shock dampening unit is further configured to detect a transmission mode based on transmission mode data received from a transmission of the vehicle, and determine a vehicle speed based on vehicle speed data received from a speedometer, and
wherein analyzing the vibration data to detect the engine shock event comprises:
detecting the engine shock event when the transmission mode is park, neutral, or reverse, and
detecting the engine shock event when the transmission mode is drive, and a vehicle speed is less than a vehicle speed threshold.

6. The system of claim 1, further comprising a pedal unit configured to detect accelerator pedal position data, and
wherein analyzing the vibration data to detect the engine shock event comprises detecting the engine shock event when the accelerator pedal position data received from the pedal unit indicates an accelerator pedal position less than an accelerator pedal position threshold.

7. The system of claim 1, further comprising a suspension sensor configured to detect suspension data, and
wherein analyzing the vibration data to detect the engine shock event comprises detecting the engine shock event when the suspension data received from the suspension sensor indicates a suspension variance less than a suspension variance threshold.

8. The system of claim 1, further comprising a pedal unit configured to detect brake pedal position data, and
wherein analyzing the vibration data to detect the engine shock event comprises detecting the engine shock event when the brake pedal position data received from the pedal unit indicates a brake pedal position less than a brake pedal position threshold.

9. A vehicle comprising:
an engine causing an engine shock event when turned on;
an engine vibration sensor connected to the engine and configured to detect vibration data;
an engine shock dampening unit configured to:
determine a vibration waveform based on the vibration data,
analyze the vibration data received from the engine vibration sensor to detect the engine shock event, and
determine a vibration cancellation instruction for partially or completely cancelling the vibration from the engine shock event when the engine shock event is detected; and
a vibration unit configured to vibrate in an opposing direction of the vibration from the engine shock event based on the vibration cancellation instruction such that the vibration from the engine shock event is reduced.

10. The vehicle of claim 9, wherein determining the vibration cancellation instruction comprises determining a cancelling waveform having a same amplitude as the vibration waveform and an inverted phase of the vibration waveform.

11. The vehicle of claim 9, wherein analyzing the vibration data to detect the engine shock event comprises detecting the engine shock event when an amplitude of the vibration waveform exceeds an amplitude threshold or a period of the vibration waveform is less than a period threshold.

12. The vehicle of claim 9, wherein the engine shock dampening unit is further configured to detect an engine state based on engine state data received from the engine, and detect the engine shock event when the engine state transitions from an off state to an on state.

13. The vehicle of claim 9, wherein the engine shock dampening unit is further configured to detect a transmission mode based on transmission mode data received from a transmission of the vehicle, and determine a vehicle speed based on vehicle speed data received from a speedometer, and
wherein analyzing the vibration data to detect the engine shock event comprises:
detecting the engine shock event when the transmission mode is park, neutral, or reverse, and
detecting the engine shock event when the transmission mode is drive, and a vehicle speed is less than a vehicle speed threshold.

14. The vehicle of claim 9, further comprising a pedal unit configured to detect accelerator pedal position data or brake pedal position data, and
wherein analyzing the vibration data to detect the engine shock event comprises detecting the engine shock event when the accelerator pedal position data received from the pedal unit indicates an accelerator pedal position less than an accelerator pedal position threshold or the brake pedal position data received from the pedal unit indicates a brake pedal position less than a brake pedal position threshold.

15. The vehicle of claim 9, further comprising a suspension sensor configured to detect suspension data, and
wherein analyzing the vibration data to detect the engine shock event comprises detecting the engine shock event when the suspension data received from the suspension sensor indicates a suspension variance less than a suspension variance threshold.

16. A method for reducing vibration from an engine shock event caused by turning on an engine of a vehicle, the method comprising:
detecting, by an engine vibration sensor, vibration data;
analyzing, by an engine shock dampening unit, the vibration data received from the engine vibration sensor to detect the engine shock event;
determining, by the engine shock dampening unit, a vibration cancellation instruction for partially or completely cancelling the vibration from the engine shock event when the engine shock event is detected; and vibrating, by a vibration unit, in an opposing direction of the vibration from the engine shock event based on the vibration cancellation instruction such that the vibration from the engine shock event is reduced.

17. The method of claim 16, wherein determining the vibration cancellation instruction comprises determining a vibration waveform based on the vibration data, and determining a cancelling waveform having a same amplitude as the vibration waveform and an inverted phase of the vibration waveform.

18. The method of claim 16, wherein analyzing the vibration data to detect the engine shock event comprises determining a vibration waveform based on the vibration data, and detecting the engine shock event when an amplitude of the vibration waveform exceeds an amplitude threshold or a period of the vibration waveform is less than a period threshold.

19. The method of claim 16, further comprising detecting, by the engine shock dampening unit, an engine state based on engine state data received from the engine, and detecting the engine shock event when the engine state transitions from an off state to an on state.

20. The method of claim 16, further comprising detecting, by the engine shock dampening unit a transmission mode based on transmission mode data received from a transmission of the vehicle, and determining a vehicle speed based on vehicle speed data received from a speedometer, and
  wherein analyzing the vibration data to detect the engine shock event comprises:
    detecting the engine shock event when the transmission mode is park, neutral, or reverse, and
    detecting the engine shock event when the transmission mode is drive, and a vehicle speed is less than a vehicle speed threshold.

\* \* \* \* \*